United States Patent

Tomelleri

Patent Number: 5,640,898
Date of Patent: Jun. 24, 1997

[54] MACHINE FOR AUTOMATICALLY PEELING ELONGATED FRUITS, ADVANTAGEOUSLY FOR PEELING KIWIS

[76] Inventor: Tiziana Tomelleri, 26 Via P.Caliari, Verona, Italy, I-37131

[21] Appl. No.: 564,358

[22] PCT Filed: Jun. 6, 1994

[86] PCT No.: PCT/IT94/00078

§ 371 Date: Dec. 11, 1995

§ 102(e) Date: Dec. 11, 1995

[87] PCT Pub. No.: WO94/28747

PCT Pub. Date: Dec. 22, 1994

[30] Foreign Application Priority Data

Jun. 9, 1993 [IT] Italy .................. VR93A0053

[51] Int. Cl.⁶ ........................................ A23N 7/00
[52] U.S. Cl. ......................... 99/541; 99/589; 99/590; 99/592; 99/593; 99/595; 99/596; 99/599
[58] Field of Search .................. 99/537–546, 485, 99/486, 489–491, 584–599, 623, 629; 426/481–483

[56] References Cited

U.S. PATENT DOCUMENTS

| | | |
|---|---|---|
| 1,579,771 | 4/1926 | Kools . |
| 3,368,598 | 2/1968 | Nakano .................. 99/585 |
| 3,764,717 | 10/1973 | Rood . |
| 3,842,727 | 10/1974 | Glenn et al. ............ 99/592 |
| 3,881,406 | 5/1975 | Perez .................. 99/599 X |
| 4,470,345 | 9/1984 | Miyata ................. 99/593 X |
| 4,481,875 | 11/1984 | Toyosato ............... 99/593 X |
| 4,503,761 | 3/1985 | Cailloux ................... 99/486 |
| 4,671,965 | 6/1987 | Harris et al. .............. 426/482 |
| 4,708,056 | 11/1987 | Dinanath .................. 99/568 |
| 4,718,333 | 1/1988 | Pierce et al. ............ 99/595 X |
| 4,753,159 | 6/1988 | Eaton .................... 99/596 |
| 4,765,234 | 8/1988 | Cailliot ................ 99/597 X |
| 5,454,300 | 10/1995 | Rainey et al. .......... 99/593 X |
| 5,558,011 | 9/1996 | Heim ..................... 99/595 |

FOREIGN PATENT DOCUMENTS

| | | |
|---|---|---|
| 621411 | 3/1992 | Australia . |
| 94/10863 | 5/1994 | WIPO . |

*Primary Examiner*—Timothy F. Simone
*Attorney, Agent, or Firm*—Evenson, McKeown, Edwards & Lenahan, P.L.L.C.

[57] ABSTRACT

A machine (10) for automatically peeling substantially elongated fruits (15), advantageously for peeling kiwis, comprising a frame (11) supporting a conveyor suitable for translating said fruits (15) from a first feeding station towards a peeling station, said conveyor being provided with means (14) suitable for substantially aligning to each other the longitudinal axes of the fruits which are placed on the conveyor and for rotating said fruits about said longitudinal axes. Furthermore, the machine comprises at least a peeling device (30) cooperating with said means (14) provided on the conveyor, said device (30) being provided with means (53) for cutting and raising a given area of skin of each fruit (15), said cutting and raising means (53) acting during the rotation phase of the fruit about its longitudinal axis.

15 Claims, 3 Drawing Sheets

MACHINE FOR AUTOMATICALLY PEELING ELONGATED FRUITS, ADVANTAGEOUSLY FOR PEELING KIWIS

The present invention relates to a machine for automatically peeling elongated fruits, advantageously for peeling fruits such as kiwis.

More particularly, the present invention relates to a machine which allows the skin of said fruits to be automatically removed and which, at the same time, allows the opposed ends thereof to be removed.

Italian patent application No. VR91A000090, in the name of the present applicant, discloses an automatic machine enabling the removal of the opposed ends of elongated fruits such as kiwis.

Said machine comprises a first working station, in which the machine is continuously fed with fruits which are disposed one by one on a roller conveyor.

Each roller has a concave outline, and each fruit is placed between the outlines of two adjacent rollers; furthermore, the rollers may be rotated about their longitudinal axis.

This rotational movement is transferred to the fruits and, in the case of kiwis, which have an elongated shape, the rotation results in the opposed ends of the fruits becoming aligned to an axis which is parallel to the rollers' axis.

During the advancing movement of the conveyor the aligned fruits reach a second working station, in which each of them is individually canalized between a pair of guides and pressed against said rollers, while the opposed ends are simultaneously removed, e.g. by means of a pair of opposed millers.

The fruit is then released and sets forth its advancing movement on the conveyor towards a discharging station.

The present invention aims to improve the machine disclosed in the patent application cited above in that, it aims to provide for a machine for automatically and entirely peeling fruits such as kiwis.

The automatic machine according to the invention achieves this purpose by carrying out the features disclosed in claim 1.

The dependent claims outline particularly advantageous forms of embodiment of the invention.

The automatic machine according to the invention comprises a first working station in which the fruits are loaded and aligned, and a second working station, in which the opposed ends of said fruits are removed.

According to the invention, the machine is provided with a third working station, in which the individual fruits, as coming from said second working station, are entirely peeled and then transferred to further working and/or discharging stations.

Said third working station comprises means suitable for advancing the kiwis on the conveyor, by rotating them about their longitudinal axis, as well as cutting means carrying out a surface cut on the skin of the kiwis advancing on the conveyor, thereby continuously removing the skin which had previously been cut.

According to a particularly advantageous form of embodiment of the invention, said cutting means comprise a device having a chain movable along the external surface of a kiwi in a direction which is substantially parallel to the kiwi's longitudinal axis, said chain being provided with a series of L-shaped cutting blades which on one hand cut the side surface of the kiwi and, on the other hand, raise the cut surface.

In this way, during the simultaneously occurring movement of the chain along the kiwi's side surface, and the rotation of the kiwi about its longitudinal axis, the whole skin of the kiwi is removed in the course of a complete rotation of the kiwi about its axis, thereby achieving the purposes of the invention.

According to another form of embodiment of the invention, the automatic machine comprises means for automatically loading and feeding the fruits on the conveyor.

According to a further advantageous form of embodiment of the invention, the automatic machine comprises means suitable for subdividing the peeled fruit into a series of circular sectors.

Other features and advantages of the invention will become apparent by reading the following description of a form of embodiment of the invention, given as a non-limiting example, with the help of the figures shown in the annexed sheets, in which.

In the figures, reference sign 10 generally indicates an automatic machine for continuously peeling elongated fruits, advantageously for peeling kiwis, according to the present invention.

Figure 1:
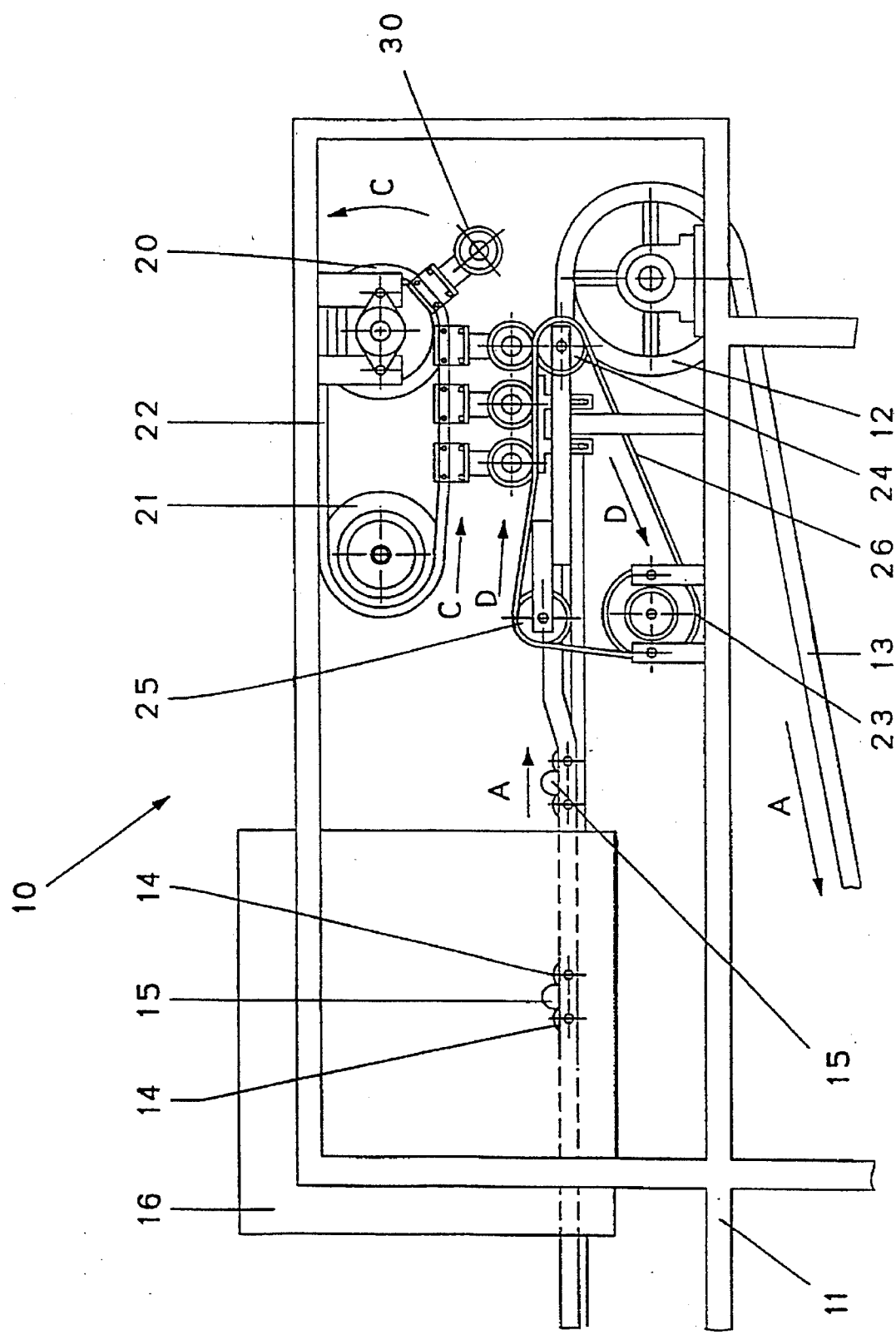
FIG. 1 shows partial schematical side view of an automatic machine according to the invention.

Machine 10 comprises a supporting frame 11 on which is placed, according to this form of embodiment, a chain conveyor comprising, close to each end of frame 11, a pair of toothed wheels of which wheel 12 is shown in FIG. 1, and a pair of chains 13 which are spaced from each other, said conveyor being driven, in the direction indicated by arrows A, by a suitable motor which is not shown in the figure.

Conveying rollers 14 (see also FIGS. 2 and 5) are placed at regularly spaced distances between chains 13, and they are connected to these by their longitudinal axles.

Said rollers have a concave outline and a surface toothing suitable for obtaining a reliable grip on the side surface of a fruit 15, such as a kiwi, which is placed between respective pairs of adjacent rollers 14.

Figure 2:
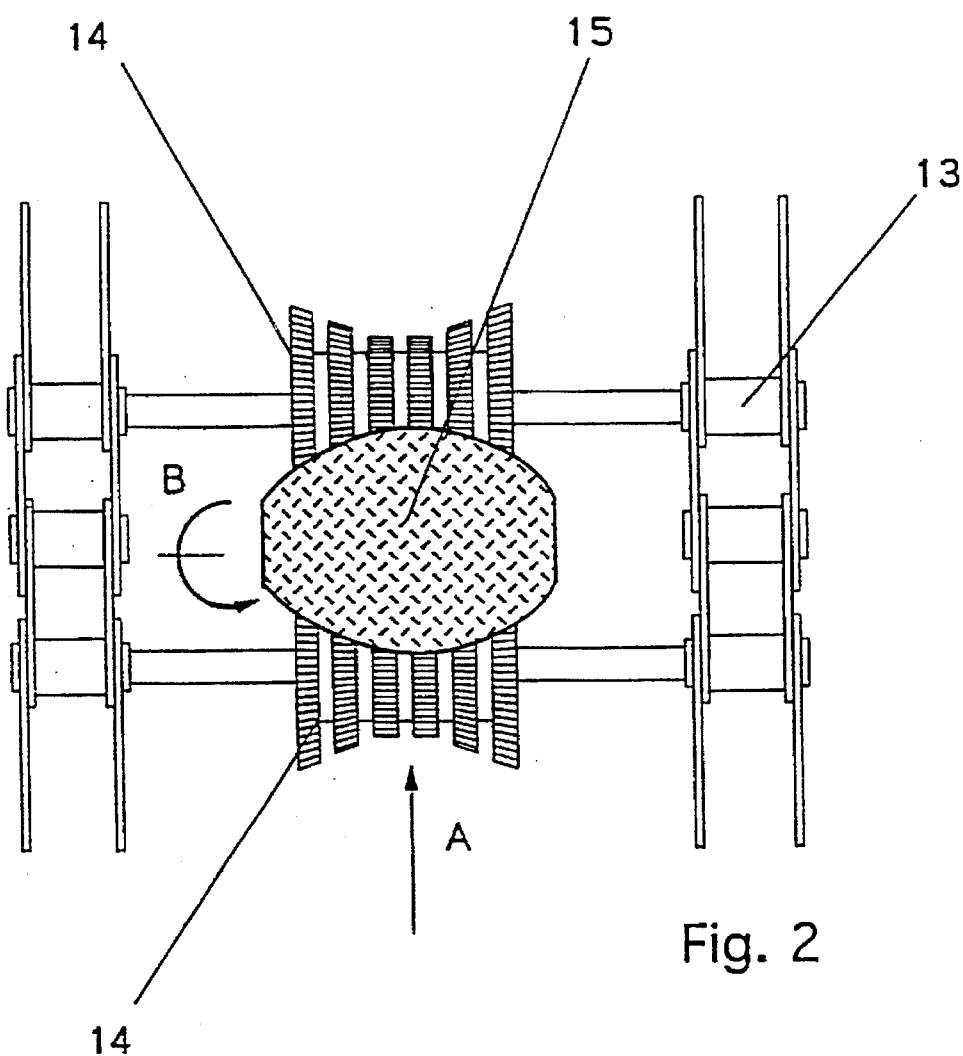
FIG. 2 shows a partial plan view of the conveyor for carrying the fruits included in the machine according to the invention.
Figure 5:
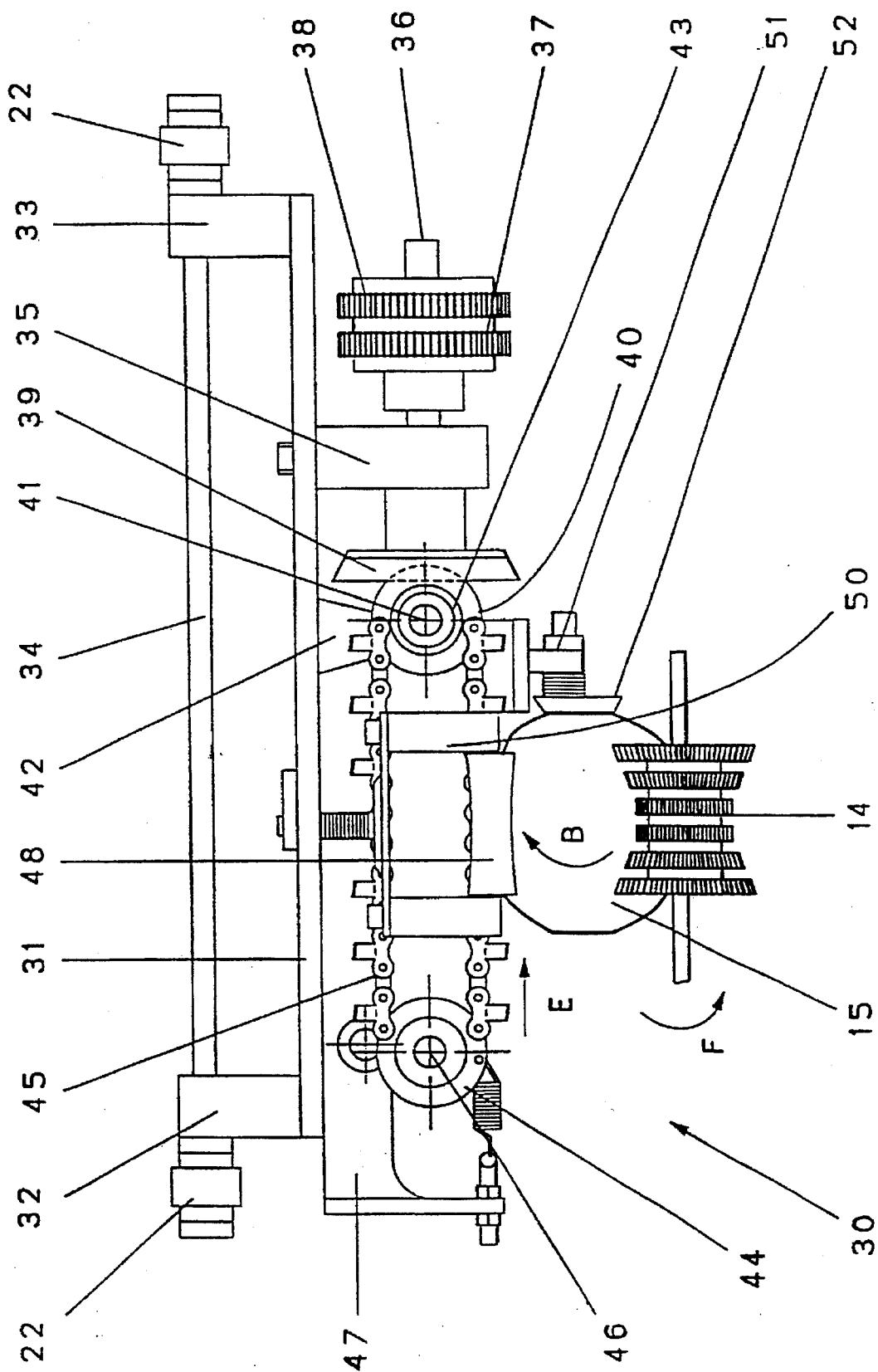

Furthermore, each roller 14 may be provided with mechanical means allowing the roller to be rotated about its longitudinal axis (see arrow B in FIGS. 2 and 5).

Such means are generally constituted by a fixed rectilinear metallic bar which is placed beneath the rollers and which contacts the side surface of said rollers.

The machine according to the invention comprises a working station 16 within of which the opposed ends of each fruit are removed from the fruit body.

A particularly advantageous form of embodiment of such working station is described in detail in italian patent application No. VR91A000090 in the name of the present applicant.

Any constructional details of said working station may be found in said patent application.

For the purposes of the present application, it may be recalled that, inside of working station 16, fruits 15 as being carried by conveyor are aligned to and centered in respect of rollers 14 and, thereafter, a pair of tools removes the opposed ends of said fruits; successively, fruits 15 set forth their movement on the conveyor until they reach another working station, where they are peeled.

The peeling station comprises two respective pairs of toothed wheels 20, 21, which are fixed to the upper part of frame 11 and which are respectively linked by chains 22.

Toothed wheels 20, 21 are driven by a suitable chain drive (not shown in the figures) starting from wheel 12.

Referring to FIG. 1, toothed wheels 20, 21 rotate in a counterclockwise direction, as indicated by arrows C.

A plurality of fruit peeling devices 30 is connected to respective pairs of chain links; the operation of said devices 30 will later be described in detail.

FIG. 1 shows four peeling devices 30; however, this form of embodiment is provided with twelve peeling devices.

Obviously, the total number of peeling devices may be varied in accordance with different design requirements.

Three idle toothed wheels 23, 24, 25, linked by a chain 26, are fixed to frame 11; these wheels are placed in such a way, that chain 26 runs at least partially along a horizontal path, in which chain 26 cooperates with peeling devices 30 in a way which will later be described in detail.

In operation, toothed wheels 23, 24, 25 rotate in a clockwise direction as indicated by arrows D.

Particularly referring to FIG. 5, peeling device 30 will now be described.

Device 30 comprises an elongated metallic plate 31, which is rigidly connected to respective links of chains 22 by means a pair of brackets 32, 33 and connecting bars 34.

A metallic block 35 is rigidly connected to plate 31; block 35 is provided with a central bore for supporting a shaft 36 at one end of which are, according to this form of embodiment, two toothed wheels 37, 38 suitable for cooperating, in operation, with chain 26 (see FIG. 1).

The other end of shaft 36 bears a bevel gear 39 cooperating with a conjugate bevel gear 40 supported by a metallic block 42 integral to plate 31; in this way, the rotational movement of shaft 36 is rotated by 90° and is then transformed into a corresponding rotational movement of shaft 41 of bevel gear 40.

A toothed wheel 43 is supported at one end of shaft 41; this toothed wheel 43 is driven by said shaft 41 and it transfers the motion to a second toothed wheel 44, whose shaft 46 is connected to a metallic block 47, integral to plate 31, by means of a chain 45.

Thus, the rotational movement generated by shaft 36 results in a counterclockwise movement of chain 45, as indicated by arrows F.

Furthermore, idly mounted pressing rollers 48, supported by pairs of metallic blocks 49, 40, are connected to plate 31 by means of a resilient coupling.

These pressing rollers 48 are suitable for exerting a force towards the fruit, in such a way that the latter is pushed towards the conveyor rollers 14, thereby obtaining a reliable rotational movement (arrow B) of each fruit about its longitudinal axis.

Metallic block 42 bears a bracket 51 on which is resiliently mounted a metallic plate 52 forming an abutment against of which one end of the fruit rests during the device operation.

Figures 3, 4:
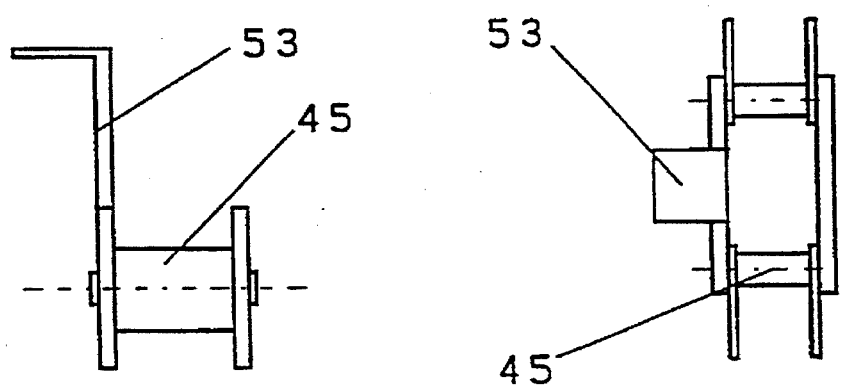
FIG. 3 shows a schematical front view, on an enlarged scale, of a link of the chain which carries out the fruit peeling operation.
FIG. 4 shows a schematical plan view, on an enlarged scale, of a link of the chain which carries out the fruit peeling operation, and FIG. 5 Shows a schematical front view of the fruit peeling device, while it cooperates with the fruit as carried by the machine conveyor.

According to the invention, each of the links of chain 45 is provided (see FIG. 4 and 5) with a L-shaped extension 53 which constitutes a cutting and raising element for the side surface of fruit 15.

Mainly referring to FIGS. 1 and 5 the operation of the machine according to the invention will now be described.

Fruits 15, which are advantageously constituted by kiwis, are individually, manually or automatically, placed between rollers 14 of the conveyor, which is moving and which drives chains 13.

Fruits 15 reach station 16, in which the opposed ends are removed and, once this operation has been carried out, they set forth their movement towards the peeling station.

In the meantime, chain 22 is driven, as described above, by a suitable transmission drive linked to toothed wheel 12; the movement of chain 22 results in the movement according to arrow C of the various peeling devices 30.

It may be noted that, during the movement of chains 22, toothed wheels 37, 38 of each device 30 transitorily contact chain 26 which links toothed wheels 23, 24, 25.

Once this happens, the cooperation between toothed wheels 37, 38 and chain 26 results in the rotation of shaft 36 which drives chain 45, as indicated by arrow E, by means of bevel gear pair 39-40, shaft 41 and toothed wheels 43, 44.

Fruit 15 reaches the working area of device 30, and its side surface undergoes a vertical pressure by pressing rollers 48; thus, the fruit rotates about its longitudinal axis as indicated by arrow B in FIG. 5.

At the same time, L-shaped blades 53 provided on chain 45, which carries out a movement as indicated by arrow E in FIG. 5, successively cut and raise the skin of fruit 15, whose position is held by the combined action of pressing rollers 48, of carrying rollers 14 and, laterally, of abutment plate 52; therefore, the fruit skin is removed as thin stripes during the rotating movement of the fruit, thereby achieving the purposes of the invention.

The procedure is continuously repeated for each fruit which is present on the conveyor by means of a plurality of peeling devices 30.

According to a further feature of the invention, machine 10 is provided with a fruit cutting device acting downstream of the peeling station.

Such cutting device, which is not illustrated in the figures, is constituted by a series of rotating blades which are adjacent and parallel to each other; these blades penetrate into radial grooves (see FIGS. 2 and 5) of conveyor rollers 14 and subdivide each fruit into a series of distinct sectors.

Furthermore, a fruit collecting device (not shown in the figures) is placed at one end of machine 10.

Finally, machine 10 is provided with suitable hydraulic means (not shown in the figures) which carry out a continuous washing operation of the devices comprised inside of respective ends-removing and skin-peeling areas, in such a way as to keep the working tools clean and to remove the waste towards a suitable waste collecting and discharging device.

The invention has been described by referring to a particularly advantageous form of embodiment thereof.

However, it appears to be clear that the invention englobes many other forms of embodiment which fall within its scope.

Thus, the invention includes forms of embodiment according to which the removal of the opposed ends of the fruits takes place by means different from those which are disclosed in italian patent application No. VR91A000090 cited above.

Furthermore, the number of peeling devices 30 may be widely varied, according to different design requirements.

Still, the shape and the disposition of the peeling blades may be widely modified in accordance to the dimensions and to the ripeness of the fruits to be peeled.

The different mechanical links (chain drives, bevel gear pairs, toothed wheels etc.) may finally easily be replaced by equivalent means by a skilled man.

I claim:

1. Machine (10) for automatically peeling substantially elongated fruits (15), advantageously for peeling kiwis, comprising a frame (11) supporting a conveyor suitable for translating said fruits (15) from a first feeding station towards a peeling station, said conveyor being provided with means (14) suitable for substantially aligning to each other the longitudinal axes of the fruits which are placed on the conveyor and for rotating said fruits about said longitudinal axes, characterised in that it comprises at least a peeling device (30) cooperating with said means (14) provided on the conveyor, said device (30) being provided with means (53) for cutting and raising a given area of skin of each fruit (15), said cutting and raising means (53) acting during the rotation phase of the fruit about its longitudinal axis.

2. Machine (10) according to claim 1, characterised in that said conveyor comprises at least a pair of opposed toothed wheels (12) linked by at least a pair of chains (13), the rotation axis of one of said toothed wheels being connected to a motor.

3. Machine (10) according to claim 2, characterised in that said aligning means provided on the conveyor include a series of rollers (14) which are individually idly mounted between a pair of chains (13), the longitudinal axis of each roller (14) being perpendicular to the advancing direction (A) of said conveyor.

4. Machine (10) according to claim 3, characterised in that the side surface of each of said rollers (14) is concave, and in that two adjacent rollers (14) define with their side surfaces a fruit supporting area.

5. Machine (10) according to claim 3, characterised in that the side surface of said rollers (14) comprises a series of radial grooves parallel to each other.

6. Machine (10) according to claim 2 characterised in that said at least one peeling device (10) is movable by means of a drive linked to the motor of the machine (10).

7. Machine (10) according to claim 6, characterised in that said at least one peeling device (30) is fixed between two opposed links of a chain pair (22) placed between respective toothed wheels (20, 21) and moved by means of said drive.

8. Machine (10) according claim 6, characterised in that said peeling device (30) comprises means (37, 38) suitable for transitorily moving said cutting and raising means (53).

9. Machine (10) according to claim 8, characterised in that said moving means (37, 38) comprise at least one toothed wheel (37, 38) suitable for being rotated about an axis (36) and which transitorily cooperates with a chain (26) disposed between toothed wheels (23, 24, 25) which are connected to the frame (11) of the machine (10).

10. Machine (10) according to claim 9, characterised in that said means for cutting and raising the skin of the fruit (15) are constituted by a series of blades (53) having a predetermined shape and which are mounted on the links of a chain (45) moved, by means of a suitable drive (39, 40, 41, 44) by said at least one transitorily moved toothed wheel (37, 38).

11. Machine (10) according to claim 10, characterised in that said blades (53) are L-shaped.

12. Machine according to claim 1, characterised in that said at least one peeling device (30) comprises pressing rollers (48) suitable for transitorily exerting a resilient pressure on the body of the fruit (15) advancing on the conveyor.

13. Machine (10) according to claim 1, characterised in that a station for removing the opposed ends of said fruits (15) is placed upstream of said peeling station.

14. Machine according to claim 4, wherein the side surface of said rollers comprises a series of radial grooves parallel to each other.

15. Machine according to claim 3 wherein said at least one peeling device is movable by means of a drive linked to the motor of the machine.

* * * * *